United States Patent
Pabla et al.

(10) Patent No.: US 6,892,360 B1
(45) Date of Patent: May 10, 2005

(54) FOCUS TRAVERSAL MECHANISM FOR GRAPHICAL USER INTERFACE WIDGETS

(75) Inventors: Kuldipsingh Pabla, Santa Clara, CA (US); Venkatesh Narayanan, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 259 days.

(21) Appl. No.: 09/129,380

(22) Filed: Aug. 5, 1998

(51) Int. Cl.[7] .............................................. G06F 6/00
(52) U.S. Cl. ..................................... 715/802; 715/810
(58) Field of Search ................................. 715/764, 802, 715/810, 804; 345/163, 145, 146, 157, 147, 173, 333, 335, 339

(56) References Cited

U.S. PATENT DOCUMENTS

| | | | | |
|---|---|---|---|---|
| 5,544,299 A | * | 8/1996 | Wenstrand et al. | 345/335 |
| 5,642,131 A | * | 6/1997 | Pekelney et al. | 345/145 |
| 5,745,115 A | * | 4/1998 | Purple et al. | 345/352 |
| 5,757,358 A | * | 5/1998 | Osga | 345/146 |
| 5,835,088 A | * | 11/1998 | Jaaskelainen, Jr. | 345/343 |
| 5,963,191 A | * | 10/1999 | Jaaskelainen, Jr. | 345/145 |
| 5,982,370 A | * | 11/1999 | Kamper | 345/356 |
| 5,990,862 A | * | 11/1999 | Lewis | 345/145 |
| 6,078,323 A | * | 6/2000 | Gest | 345/172 |
| 6,137,487 A | * | 10/2000 | Mantha | 345/762 |

OTHER PUBLICATIONS

Mastering WINDOWS 3.1 copyright @ 1993.*
Journal PC/Computing Nov. 1995.*
"Technique to Move Focus in Presentation Manager Applications", IBM Technical Disclosure Bulletin, US, IBM Corp., New York, vol. 34, No. 11, p. 278–279, XP000303262, ISSN: 0018–8689.

* cited by examiner

Primary Examiner—Cao (Kevin) Nguyen
(74) Attorney, Agent, or Firm—Finnegan, Henderson, Farabow, Garrett & Dunner LLP

(57) ABSTRACT

Selectively determining a particular graphical user interface widget to receive focus based upon user-entered directional information. When a user enters information concerning which direction to move the focus of the widgets, such as by manipulating arrow keys, the system uses geometry of a current widget and other visible traversable widgets in combination with the user-entered information to determine the next widget, and it moves the focus to that widget.

6 Claims, 9 Drawing Sheets

FOCUS TRAVERSAL MECHANISM FOR GRAPHICAL USER INTERFACE WIDGETS

FIELD OF THE INVENTION

The present invention relates to an apparatus and methods for selecting graphical user interface (GUI) widgets based upon user-entered information.

BACKGROUND OF THE INVENTION

Many devices include GUIs presenting widgets. A "widget" refers to a screen element on a video display. The GUIs may illustrate focus for a particular one of the widgets, indicating that the widget has been selected. "Focus" refers to any visual information distinguishing one displayed widget from other displayed widgets, and all events from an input device are typically directed to a currently focused widget. For example, the device may highlight the selected widget on the GUI or display it in a different color compared with the other displayed widgets. Users may select widgets using a pointing device, such as "mouse," to move a cursor to a particular widget and "click on" the widget to select it. These pointing devices thus allow direct selection of widgets.

Not all devices with GUIs, however, include associated pointing devices. For example, set-top boxes for televisions typically include only the box and a keyboard. In order for a user to select a widget displayed on an associated television, the user must use keys on the keyboard, such as arrow keys, to move focus from one widget to the next. A system controlling the focus of the widgets thus must interpret those directional commands from the arrow keys in order to determine the next widget to receive focus. Determining which widget to receive focus is further complicated when many widgets are displayed and potentially overlapping one another.

Accordingly, a need exists for a system and method to determine which widget will focus based upon user-entered directional information in order to effect a visually appealing interaction with the GUI.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

SUMMARY OF THE INVENTION

Apparatus and methods consistent with the present invention determine which widget among a plurality of widgets displayed on a GUI will receive focus based upon user-entered information concerning a direction in which to move the focus and positional information relative to the displayed widgets.

A method consistent with the present invention includes receiving user-entered directional information in a data processing system having a display device displaying a plurality of widgets. The method also includes determining a selected one of the widgets to be displayed with focus based upon the user-entered directional information and positional information for each of the displayed widgets, and information for use in displaying the selected widget with focus is transmitted to a system controlling the display device.

An apparatus consistent with the present invention receives user-entered directional information in a data processing system having a display device displaying a plurality of widgets. The apparatus determines a selected one of the widgets to be displayed with focus based upon the user-entered directional information and positional information for each of the displayed widgets, and information for use in displaying the selected widget with focus is transmitted to a system controlling the display device.

DETAILED DESCRIPTION

Apparatus and methods consistent with the present invention determine which widget among a plurality of widgets displayed on a GUI will receive focus based upon user-entered information concerning a direction in which to move the focus and positional information relative to all of the displayed widgets. This determination helps promote a user-friendly and visually appealing interaction by a user, since the focus moves among widgets in a consistent manner.

Focus Traversal System

Figure 1:
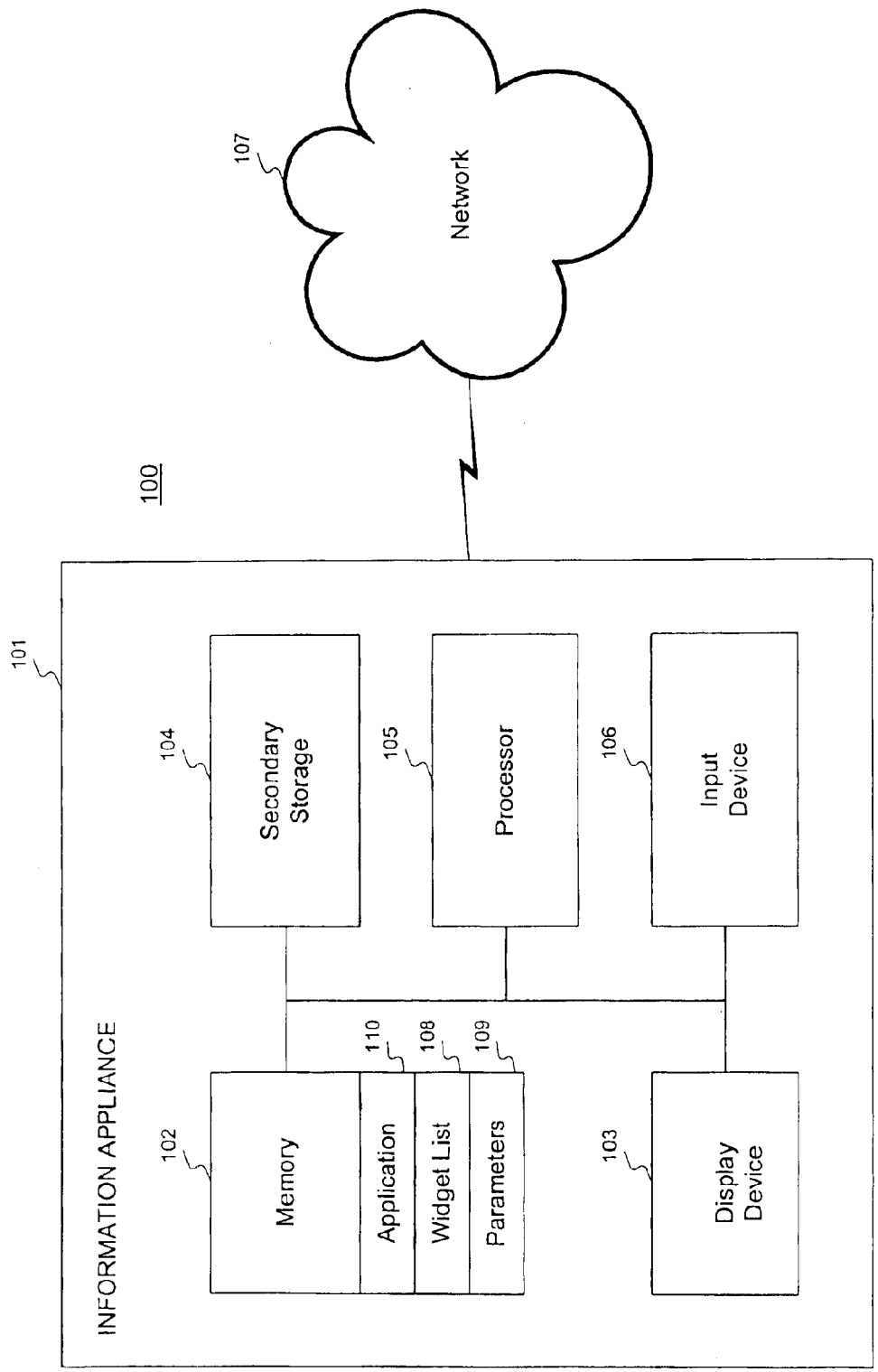
FIG. 1 depicts a data processing system suitable for practicing methods and systems consistent with the present invention.

FIG. 1 depicts a data processing system 100 suitable for practicing methods and systems consistent with the present invention. Data processing system 100 includes an exemplary information appliance 101 optionally connected to a network 107, such as the Internet. "Information appliance" refers to devices incorporating a GUI but not necessarily having an associated pointing device other than directional keys. Examples of information appliances include, but are not limited to, the following devices: a television set-top box; an e-mail device; an electronic address book; an electronic personal organizer; and a smart telephone.

Information appliance 101 includes a memory 102, a secondary storage device 104, a processor 105 such as a central processing unit, an input device 106, and a display device 103.

Memory 102 and secondary storage 104 may store applications or information for execution and use by processor 105. Memory 102 stores a widget list 108 and parameters 109 for use in determining a selected widget. A widget list stores an identification of each of the displayed widgets and information identifying a location of the corresponding widgets on the display device, and the widget list is updated periodically in response to an application using it. Database structures other than a list may also be used to store such information. The values of parameters 109, explained below, are used in processing for determining a selected widget. Memory 102 also stores, for example, an application 110 using widget list 108 and parameters 109 for use in determining a selected widget to be displayed with focus.

Input device 106 may be used to enter directional information and possibly other information. Input device 106 does not necessarily include a pointing device for direct selection of a widget. Therefore, a system, such as application 110 controlling processor 105, determines which widget is selected on display device 103 based upon user-entered directional information. Even if input device 106 does contain a pointing device, a user may instead choose to use, for example, arrow keys to traverse widgets, in which case the system also determines a selected widget based upon user-entered directional information. Input device 106 transmits the directional information to information appliance 101 along a connection, which may include a wireline connection or a wireless connection such as use of infrared light signals.

Input device 106 includes a mechanism to receive directional information from a user. "Directional information" refers to information providing an indication of intended movement of focus among widgets in a particular direction. Such a mechanism may include directional keys like arrow keys. Arrow keys may include right and left arrow keys for entering information indicating movement in a horizontal direction, and up and down arrow keys for entering information indicating movement in a vertical direction. Other mechanisms may receive directional information, for example, a voice-activated input receiving voice commands such as up, down, right, or left.

Although information appliance 101 is depicted with various components, one skilled in the art will appreciate that this appliance can contain additional or different components. Additionally, although information appliance 101 is shown connected to network 107, information appliance 101 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from a network such as the Internet; or other forms of RAM or ROM. These aspects of the present invention may also include modules, implemented in software, hardware, or a combination, configured to perform a particular method implementing an embodiment consistent with the present invention. In addition, the computer-readable media may include instructions for controlling a computer system, such as information appliance 101, to perform a particular method.

Figure 2:
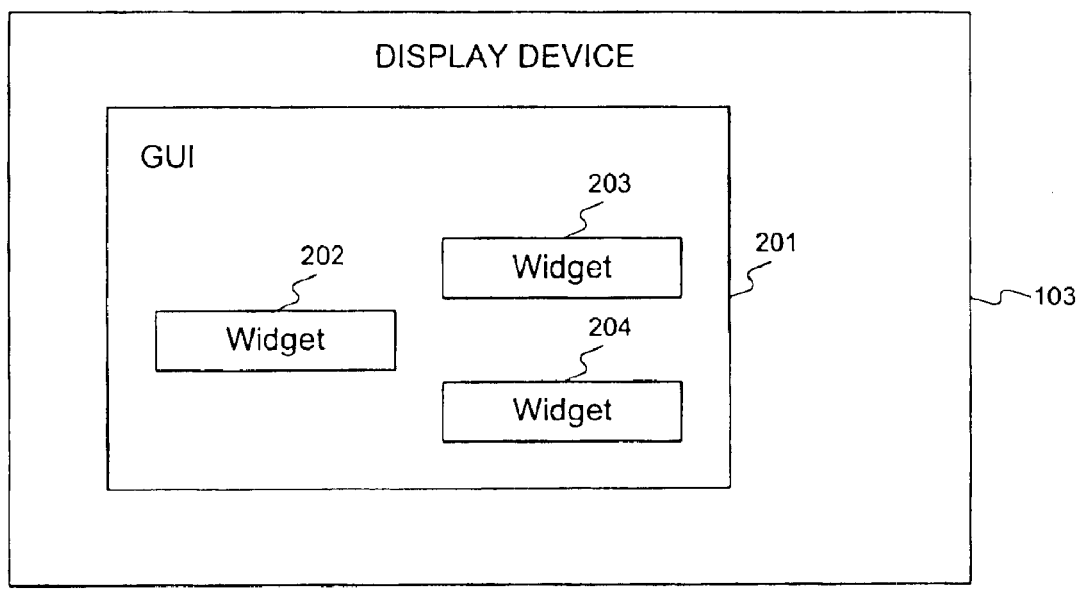
FIG. 2 depicts an exemplary GUI in the data processing system shown in FIG. 1.

FIG. 2 depicts an exemplary GUI 201 for displaying widgets, such as widgets 202, 203, and 204, on display device 103. Only three widgets are shown for exemplary purposes; a GUI may display more or fewer widgets and may display them overlapping one another or hidden from view. When information appliance 101 receives directional information from a user through input device 106, a system within the appliance determines which widget is to receive focus. This system may be implemented in an application, such as application 110, or in a layer between an application and an operating system. If widget 202 is the current widget, for example, meaning it is currently shown with focus, and a user selects a right arrow key on input device 106, the system determines whether widget 203 or 204 will next receive focus, even though both are displayed to the right of widget 202.

The system makes the determination in such a manner as to facilitate a visually appealing interaction with the user. In particular, the system compares the location of the current widget with the location of each of the other focus traversable widgets, using the top-left corner of each widget as a reference point. The phrase "focus traversable" means that the widget is capability of being displayed with focus. For movement in a vertical direction, the system selects as the next currently focused widget the widget with minimum horizontal distance and minimum vertical distance from the current widget in the direction of movement.

For movement in a horizontal direction, the system processes the vertical distance between the current widget and the other focus traversable widgets, and it also processes the horizontal distance from the current widget. In particular, the system selects the closest widget at the same horizon as the current widget in the direction of movement; if no widget is on the same horizon, it selects the widget with the closest vertical and horizontal distance in the direction of movement, similar to the determination for vertical movement. The phrase "same horizon" refers to the same horizontal position on a display device. Although the system uses the top-left corner as a reference point, it may alternatively use a different reference point for the widgets, such as a different corner or the center of each widget.

Focus Traversal GUI

Figure 3:
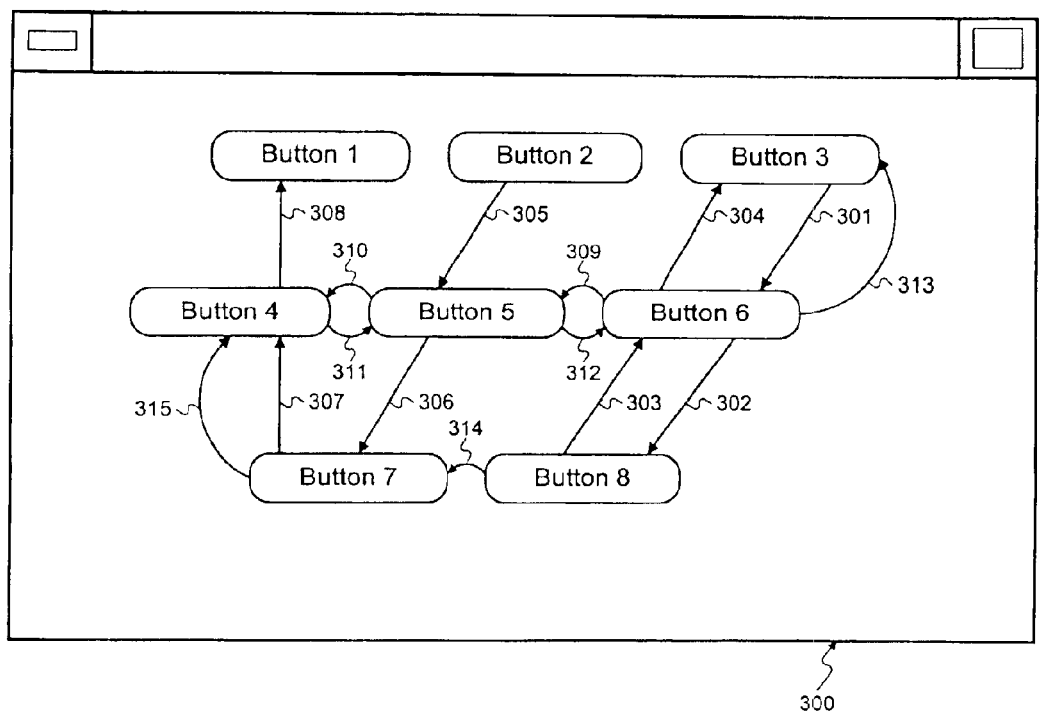
FIG. 3 is an example of a user interface illustrating operation of an embodiment consistent with the present invention.
Figure 4A:
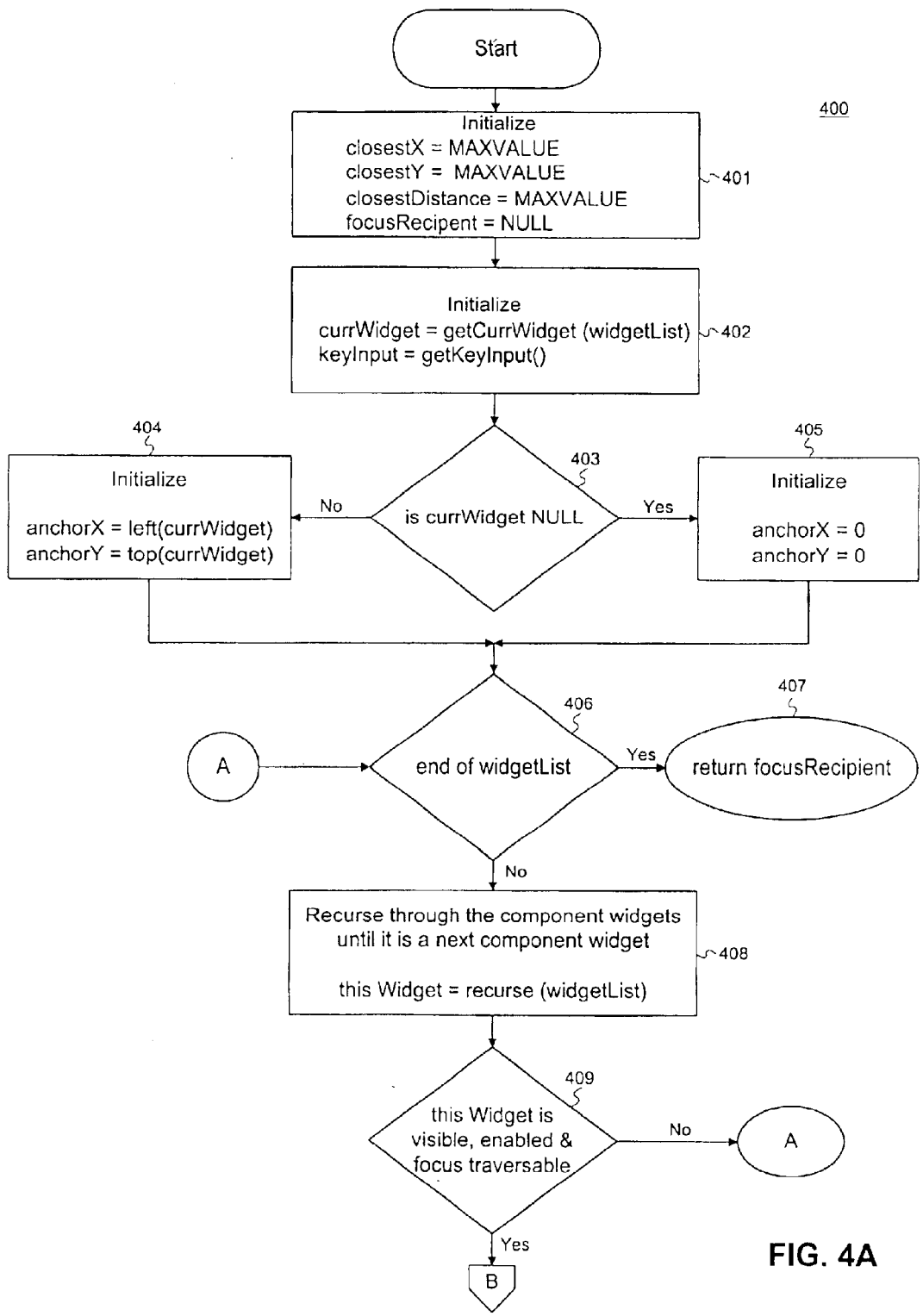
FIGS. 4A–4F are a flow chart illustrating exemplary processing associated with the user interface shown in FIG. 3.
Figure 4B:
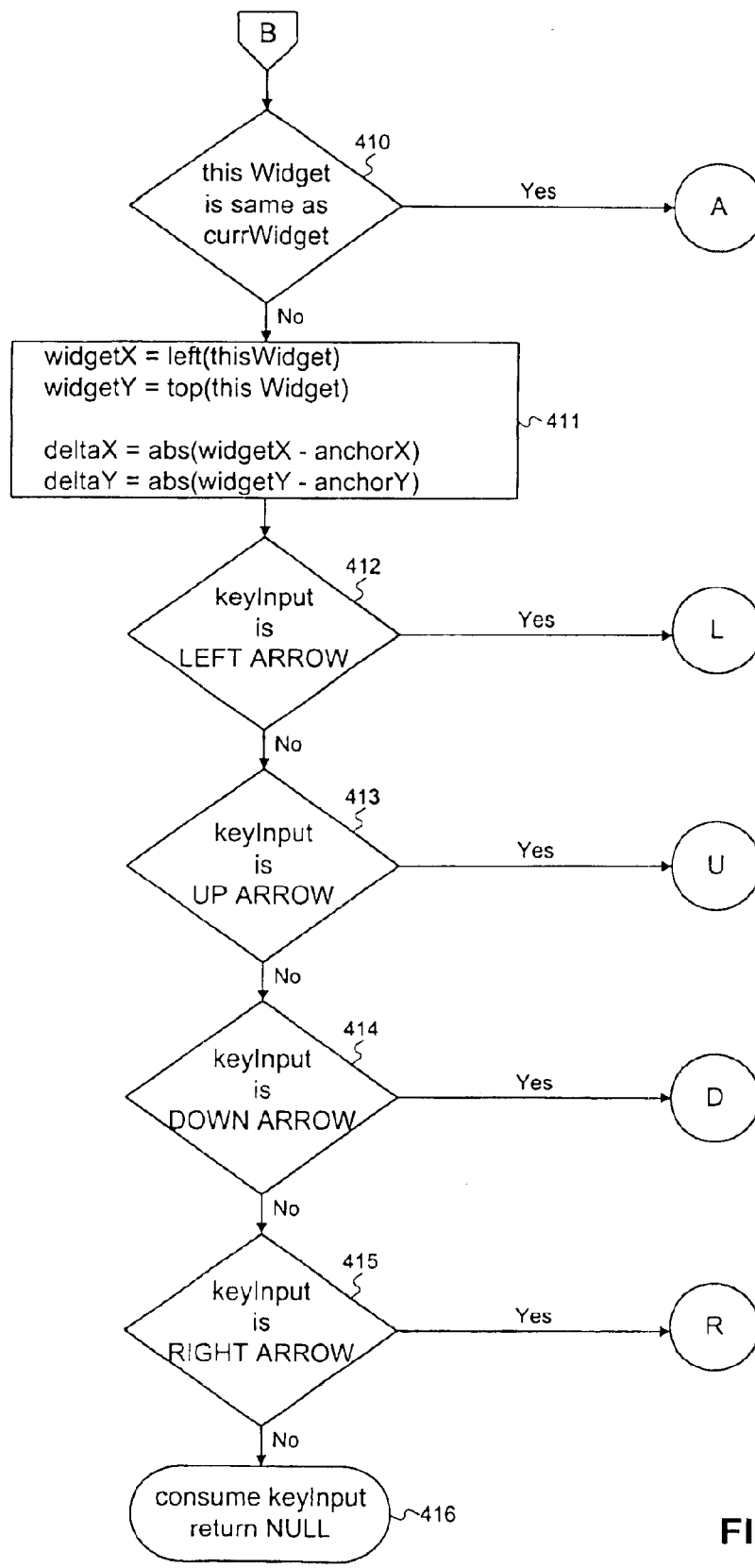
Figure 4C:
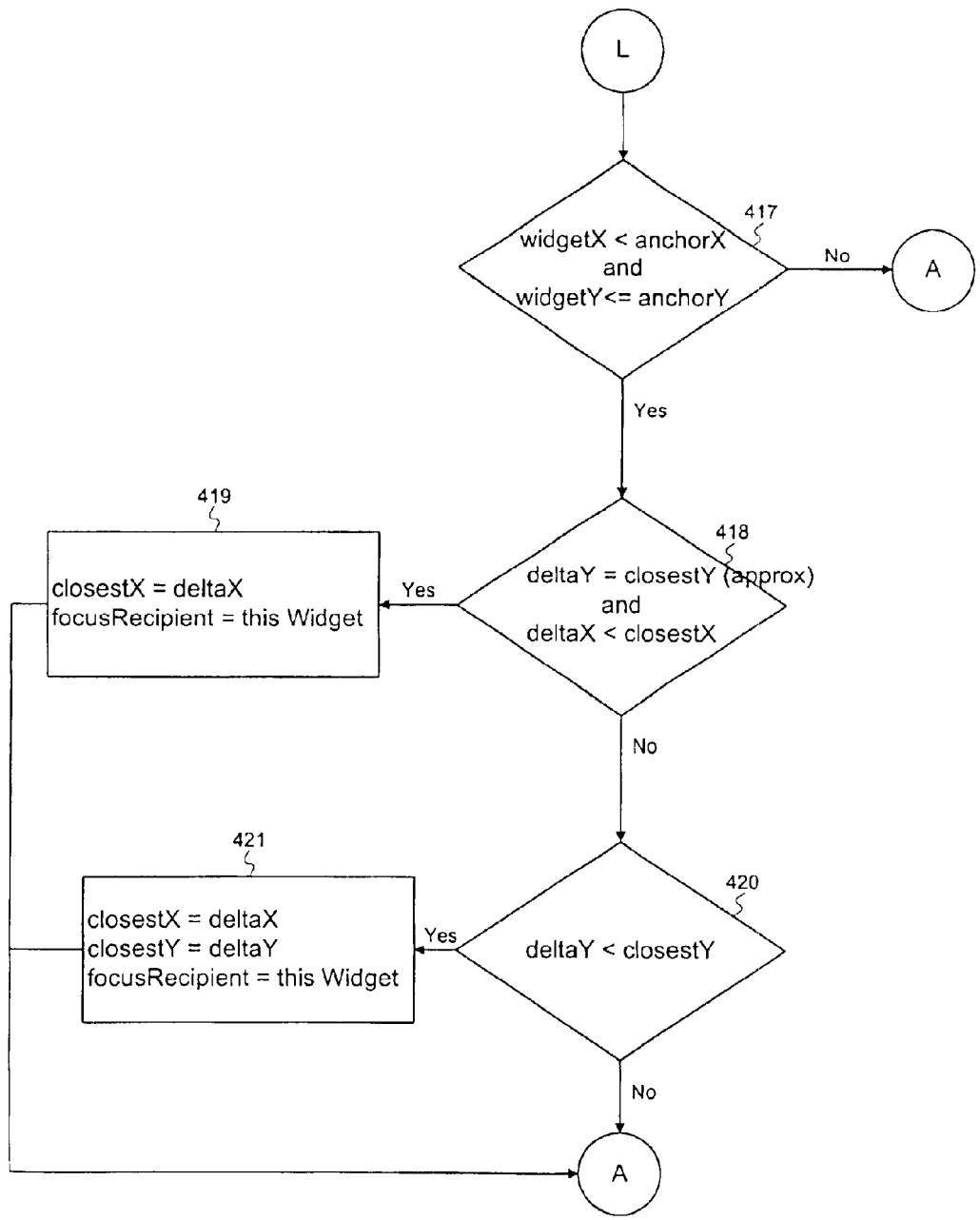
Figure 4D:
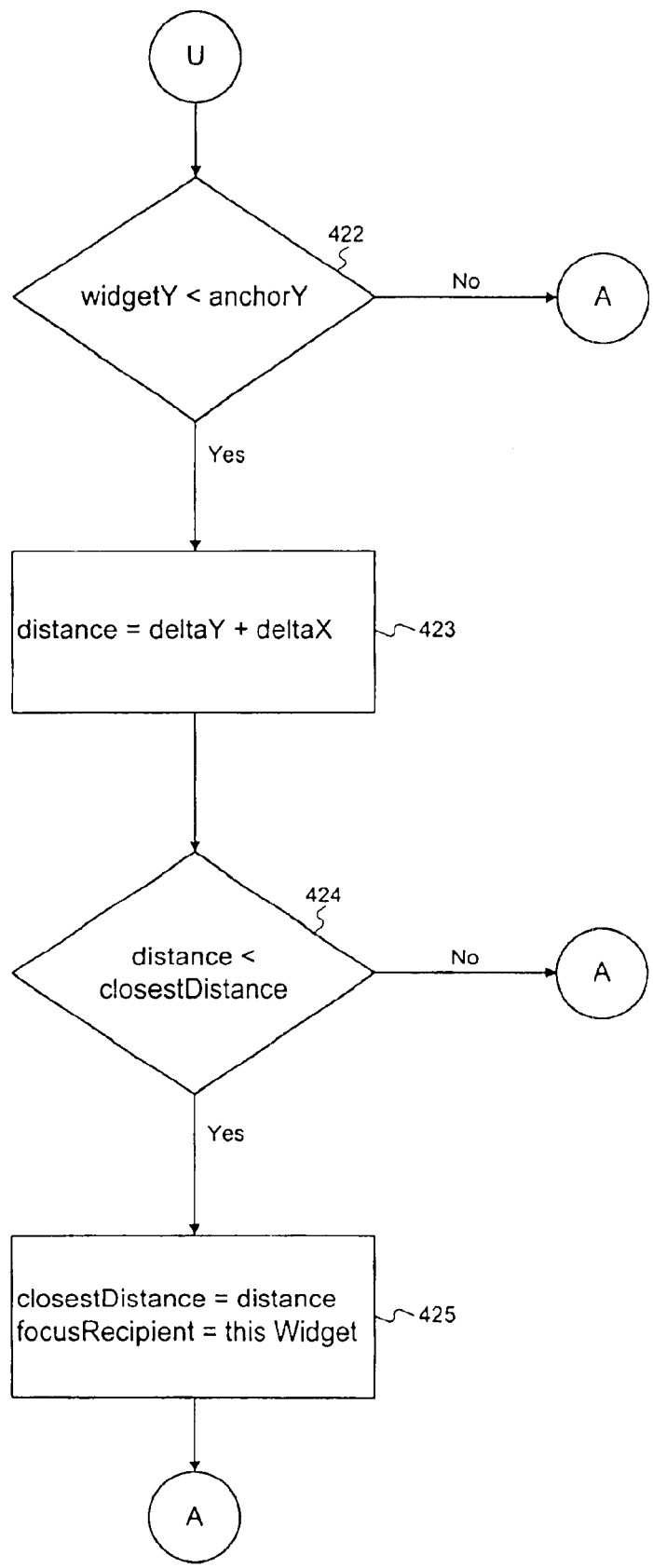
Figure 4E:
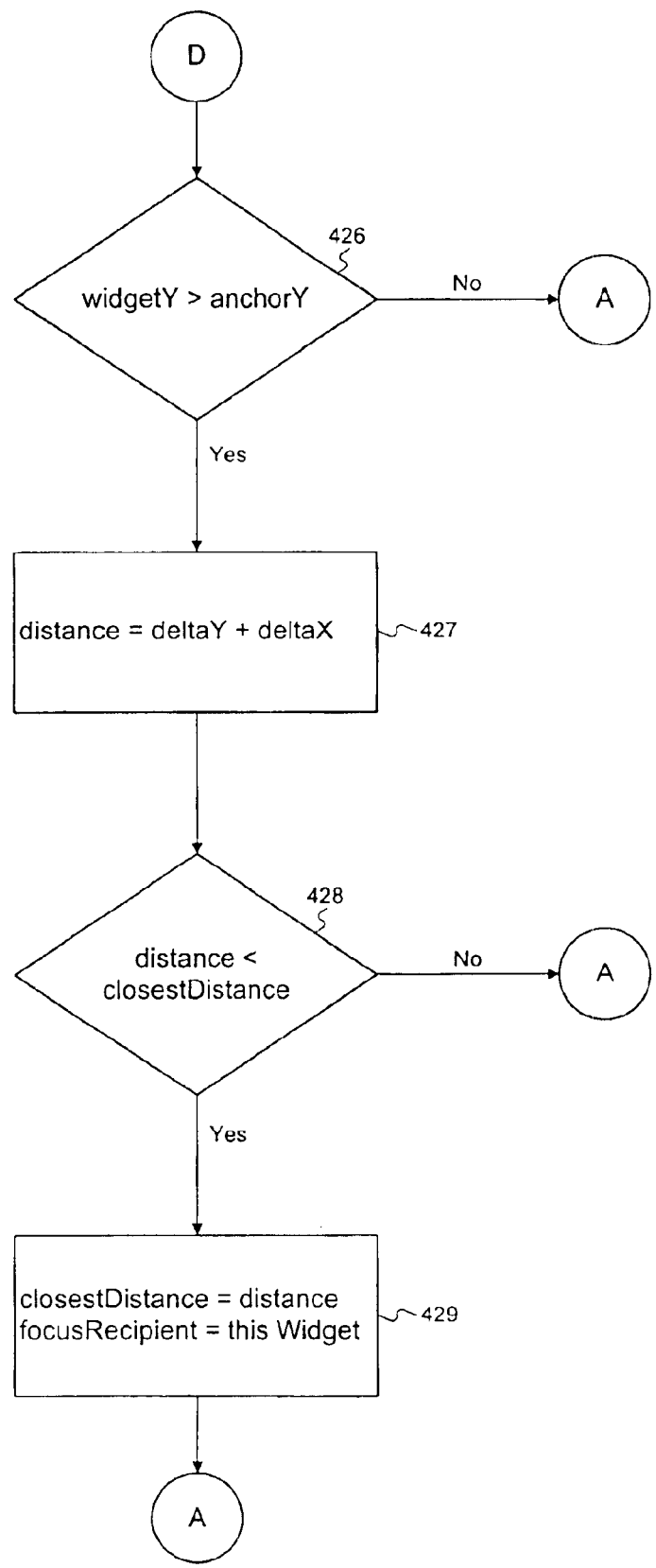
Figure 4F:
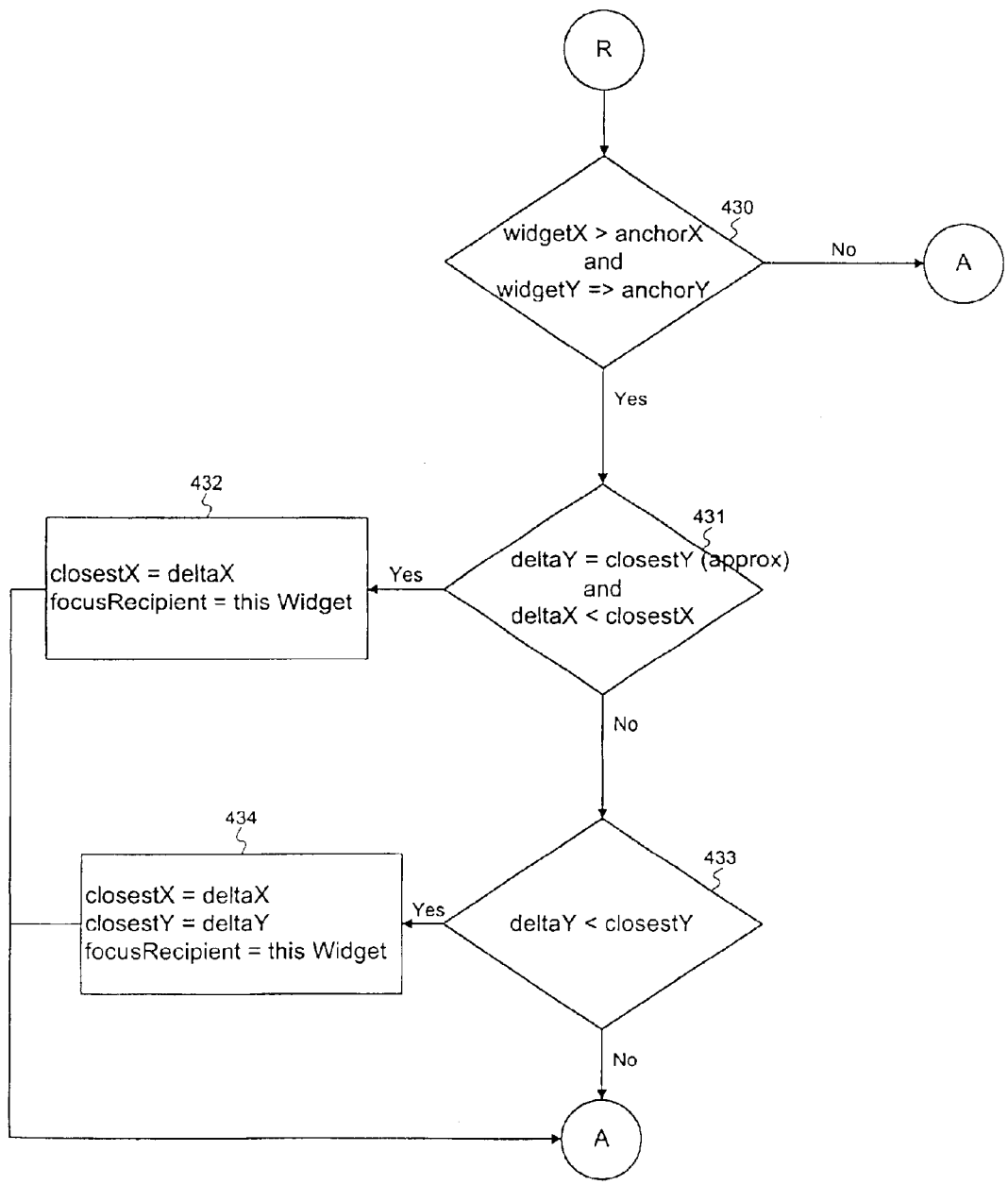

FIG. 3 is an example of a user interface 300 illustrating operation of an embodiment consistent with the present invention. This exemplary user interface may correspond to GUI 201 presented on display device 103 under control of processor 105. The buttons in user interface 300 are examples of widgets. The arrows between the buttons represent traversal of focus of the buttons in response to particular arrow key inputs. The system may receive these key inputs from input device 106. FIG. 3 includes for illustrative purposes some of the possible traversals between buttons, and other traversals are possible.

Lines 301 and 302 represent traversal of focus in response to down arrow key inputs, in which case focus traverses from button 3 to button 6 (line 301) and then from button 6 to button 8 (line 302). Likewise, lines 305 and 306 represent traversal of focus from button 2 to button 5 (line 305) and from button 5 to button 7 (line 306) in response to down arrow key inputs.

Lines 303 and 304 represent traversal of focus in response to up arrow key inputs, in which case focus traverses from button 8 to button 6 (line 303) and then from button 6 to button 3 (line 304). Likewise, lines 307 and 308 represent traversal of focus from button 7 to button 4 (line 307) and from button 4 to button 1 (line 308) in response to up arrow key inputs. Although a down arrow key input moved focus from button 5 to button 7, an up arrow key input in comparison moves focus from button 7 to button 4. Buttons 4 and 5 are both the same distance above button 7, but button 4 is considered closer because its reference point (the top-left corner in this example) has a shorter horizontal distance to the reference point for button 7.

Lines 309 and 310 represent traversal of focus in response to left arrow key inputs, in which case focus traverses from button 6 to button 5 (line 309) and then from button 5 to button 4 (line 310). Likewise, line 314 represents traversal of focus from button 8 to button 7 in response to a left arrow key input. With focus on button 7, a left arrow key input results in focus moving to button 4, as represented by line 315. Since no widget is on the same horizon as button 7 to the left of the button, focus moves to the widget with the closest vertical and horizontal distance from button 7 in the direction of movement, in this example button 4.

Lines 311 and 312 represent traversal of focus in response to right arrow key inputs, in which case focus traverses from button 4 to button 5 (line 311) and then from button 5 to button 6 (line 312). With focus on button 6, a right arrow key input results in focus moving to button 3, as represented by line 313. Since no widget is on the same horizon as button 6 to the right of the button, focus moves to the widget with the closest vertical and horizontal distance from button 6 in the direction of movement, in this example button 3. With focus on button 3, a right arrow key input results in no change, as no button is displayed to the right to button 3. Alternatively, the system may include a wrap-around feature, in which the edges of the GUI are considered to "wrap-around." With a wrap-round feature, focus moves from button 3 to button 4 in response to a right arrow key input; if the edges are considered to wrap-around, then button 4 is closest to button 3 in the direction of movement and wrapping around the right edge of the GUI.

Focus Traversal Processing

FIGS. 4A–4F are a flow chart illustrating an exemplary process 400 associated with the user interface shown in FIG. 3. This processing may be implemented in software, such as application 110, stored in memory 102 or secondary storage 104 for controlling operation of processor 105. These flow charts illustrate an example of a method for implementing the principles of widget selection identified above, and other methods are possible for implementing those principles.

In process 400, the system first performs initialization steps. In particular, it initializes parameters 109 used by the process (step 401) and retrieves widget list 108 (step 402). These exemplary parameters include the following: a current widget ("currWidget") parameter used to identify a currently focused widget; closestX and closestY parameters used to determine a widget that is closest horizontally and vertically, respectively, to a currently focused widget; a closestDistance parameter defined by the sum of the closestX and closestY parameters used to determine a widget closest in combined horizontal and vertical directions to a currently focused widget; a focusRecipient parameter used to identify the next widget to receive focus; a keyInput parameter representing the user-entered directional information; and a widgetList parameter representing widget list 108. The system also initializes the anchor parameters (anchorX and anchor Y), used to identify a location on the GUI of a widget receiving focus when a user entered a command to move focus to another widget.

The system determines if the current widget is null, meaning that no widget currently receives focus and no widgets are in widget list 108 (step 403), which may result, for example, if no focusable widgets are displayed. If the current widget is null, the system initializes the anchor points to zero (step 405); otherwise, it initializes the anchor points to the top-left position of the current widget (step 404). Initialization also involves determining if the current widget is at the end of widget list 108 (step 406). If the current widget is at the end of widget list 108, the system returns an indication to apply focus to the current widget, using the focusRecipient parameter, and thus display it as the selected widget (step 407). For example, a value of the focusRecipient parameter is transmitted to a system controlling display device 103, such as processor 105 operating under control of an application or operating system.

Otherwise, the system recursively processes the component widgets in order to identify the selected widget to receive focus (step 408). A "component" refers to a window or section of a GUI, and the component widgets are those widgets displayed at least partially within the window or section. The system selects from widget list 108 a widget to process, referred to as thisWidget. The system determines if thisWidget is visible, enabled, and focus traversable (step 409), and if not, it returns to step 406 to select another widget from widget list 108. Otherwise, the system determines if thisWidget is the same as the current widget (step 410 in FIG. 4B), and if so, it also returns to step 406.

If thisWidget is visible, enabled, and focus traversable, and if it is not the same as the current widget, then the system determines the distance between thisWidget and the current widget (step 411). It determines locations of the top-left corner of thisWidget, referred to as widgetX and widgetY parameters, and it calculates the absolute values between those parameters and the anchor points, producing deltaX and deltaY values representing the distances between the top-left corners of thisWidget and the current widget.

The system then determines which command the user selected in order to move focus to another widget, and in this example those commands involve use of arrow keys on input device 106. In steps 412–415, the system determines if the user selected a left arrow key, an up arrow key, a down arrow key, or a right arrow key. Alternatively, the system may receive directional inputs from other sources on input devices 106. If none of those keys were selected, the system returns "NULL" to indicate no change in focus (step 416).

If the user selected the left arrow key (step 412), the system performs steps 417–421. It determines if thisWidget is displayed to the left of the current widget (step 417 in FIG. 4C). If not, it returns to step 406 to obtain another widget from widget list 108. If thisWidget is displayed to the left of the current widget, the system determines if the widget is closer horizontally to the current widget than the previously processed widget by comparing values of the closestX and closestY parameters with values of the deltaX and deltaY parameters (step 418). If thisWidget is closer horizontally, the system sets the focusRecipient parameter to thisWidget (step 419). If the widget is not closer, the system determines if thisWidget is closer vertically to the current widget than the previously processed widget (step 420). If it is closer vertically, the system sets the focusRecipient parameter to thisWidget (step 421). The system then returns to step 406 to obtain another widget for processing, if necessary. Therefore, the system iteratively executes steps 417–421 to determine the next widget to receive focus in response to selection of the left arrow key.

If the user selected the up arrow key (step 413), the system performs steps 422–425. The system first determines if thisWidget is displayed above the current widget by comparing the values of the widgetY parameter and the anchorY parameter (step 422 in FIG. 4D). If thisWidget is not displayed above the current widget, the system returns to step 406 to obtain another widget from widget list 108 for processing. Otherwise, the system sets a distance parameter by adding the values of the deltaX and deltaY parameters (step 423), and it determines if thisWidget is the closest widget to the current widget by comparing the value of the combined horizontal and vertical distances with the value of the closestDistance parameter (step 424). If thisWidget is the closest widget, the system sets the focusRecipient parameter to thisWidget and sets the closestDistance parameter to the value of the combined horizontal and vertical distances (step 425). The system then returns to step 406 to obtain another widget for processing, if necessary. Therefore, the system iteratively executes steps 422–425 to determine the next widget to receive focus in response to selection of the up arrow key.

If the user selected the down arrow key (step 414), the system performs steps 426–429. The system first determines if thisWidget is displayed below the current widget by comparing the values of the widgetY parameter and the anchorY parameter (step 426 in FIG. 4E). If thisWidget is not displayed below the current widget, the system returns to step 406 to obtain another widget from widget list 108 for processing. Otherwise, the system sets a distance parameter by adding the values of the deltaX and deltaY parameters (step 427), and it determines if thisWidget is the closest widget to the current widget by comparing the value of the combined horizontal and vertical distances with the value of the closestDistance parameter (step 428). If thisWidget is the closest widget, the system sets the focusRecipient parameter to thisWidget and sets the closestDistance parameter to the value of the combined horizontal and vertical distances (step 429). The system then returns to step 406 to obtain another widget for processing, if necessary. Therefore, the system iteratively executes steps 426–429 to determine the next widget to receive focus in response to selection of the down arrow key.

If the user selected the right arrow key (step 415), the system performs steps 430–434. It determines if thisWidget is displayed to the right of the current widget (step 430 in FIG. 4F). If not, it returns to step 406 to obtain another widget from widget list 108. If thisWidget is displayed to the right of the current widget, the system determines if thisWidget is closer horizontally to the current widget than the previously processed widget by comparing values of the closestX and closestY parameters with values of the deltaX and deltaY parameters (step 431). If the widget is closer horizontally, the system sets the focusRecipient parameter to thisWidget (step 432). If thisWidget is not closer, the system determines if thisWidget is closer vertically to the current widget than the previously processed widget (step 433). If it is closer vertically, the system sets the focusRecipient parameter to thisWidget (step 434). The system then returns to step 406 to obtain another widget for processing, if necessary. Therefore, the system iteratively executes steps 430–434 to determine the next widget to receive focus in response to selection of the left right key.

Table I includes an exemplary pseudo code listing for implementing an embodiment for determining selected widgets consistent with the present invention. An application implementing this exemplary pseudo code may be stored in memory 102 or secondary storage 104 for execution by processor 105.

TABLE I

```
1)      Initializations
        initialize closestX, closestY, closestDistance to very large values
        initialize nextWidget to NULL
2)      Get the current anchor point and get the Cursor key input
        currWidget = getCurrWidget ( widgetList )
        keyInput = getKeyInput ( )
3)      if the current widget is not NULL, use its top-left corner as the anchor,
        else initialize anchor to a default value
        if      (currentWidget != NULL)
                  anchorX = LEFT (currentWidget)
                  anchorY = TOP (currentWidget)
        else
                  anchorX = default value (say 0)
                  anchorY = default value (say 0)
4)      Iterate through each widget in the widgetList
4.1)    Recurse through container widgets until a component widget is reached
        thisWidget = recurse ( widgetList )
4.2)    skip if this Widget is not visible, enabled, and focus-traversable
4.3)    skip if currentWidget is same as thisWidget
        if (currentWidget == thisWidget)
        continue
4.4)    get this widgets top-left corner point
                  widgetX = LEFT (thisWidget)
                  widgetY = TOP (thisWidget)
4.5)    compute vertical and horizontal distances between top-left corners of currentWidget and
        thisWidget
        deltaX = abs (widgetX – anchorX)
        deltaY = abs (widgetY – anchorY)
4.6)    if RIGHT move
                  if keyInput is right arrow key
4.6.1) if this widget is on the right of current widget and below or at par with current widget.
        if (widgetX > anchorX && widgetY => anchorY)
                  if this widget is vertically as close as previous marked next widget and if it is
                  horizontally closer to the current widget
                            if ( deltaY == closestY && deltaX < closestX)
                                     change closestX to deltaX
                                          closestX = deltaX
                                     mark this widget as next widget
                                          nextWidget = thisWidget
                  else if this widget is vertically closer than the previously marked next widget
                            else if (deltaY < closestY)
                                     change closestX to deltaX
                                          closestX = deltaX
                                     change closestY to deltaY
                                          closestY = deltaY
                                     mark this widget as next widget
                                          nextWidget = thisWidget
        ELSE if LEFT move
                  if keyInput is left arrow key
                  if this widget is on the left of current widget and above or at par with current widget.
                            if (widgetX < anchorX && widgetY <= anchorY)
                                     if this widget is vertically as close as previous marked next widget and if it
                                     is horizontally closer to the current widget
```

TABLE I-continued

```
            if ( deltaY == closestY && deltaX < closestX)
                change closestX to deltaX
                    closestX = deltaX
                mark this widget as next widget
                    nextWidget = thisWidget
            else if this widget is vertically closer than the previously marked next
            widget
                else if ( deltaY < closestY)
                    change closestX to deltaX
                        closest X = deltaX
                    change closestY to deltaY
                        closestY = deltaY
                    mark this widget as next widget
                        nextWidget = thisWidget
ELSE if UP move
    if keyInput is up arrow key
    if this widget is above the current widget.
        if (widgetY < anchorY)
            if this widget is horizontally and vertically closer to current widget than
            the previously marked widget
                if ( deltaY + deltaX < closestDistance)
                    change closestDistance to deltaX + deltaY
                        closestDistance = deltaX + deltaY
                    mark this widget as next widget
                        nextWidget = thisWidget
ELSE if DOWN move
    if keyInput is down arrow key
    if this widget is below the current widget.
        if (widgetY > anchorY)
            if this widget is horizontally and vertically closer to current widget than
            the previously marked widget
                if ( deltaY + deltaX < closestDistance)
                    change closestDistance to deltaX + deltaY
                        closestDistance = deltaX + deltaY
                    mark this widget as next widget
                        nextWidget = thisWidget
return next widget.
```

While the present invention has been described in connection with a preferred embodiment, many modifications will be readily apparent to those skilled in the art, and this application is intended to cover any adaptations or variations thereof. For example, different reference points on the widgets, different parameters, different types of GUIs, and varying types of input devices for entering directional information, may be used without departing from the scope of the invention. This invention is limited only by the claims and equivalents thereof.

What is claimed is:

1. A method in a data processing system having a display device for selecting a widget to be displayed with focus from among a set of displayed widgets, comprising:

receiving user-entered directional information indicating a direction of intended movement of focus from a current focused widget;

determining a next focused widget from among the set of displayed widgets based upon the user-entered directional information and positional information for each of the displayed widgets, wherein determining includes:

selecting as the next focused widget, when the directional information indicates movement in a vertical direction, a displayed one of the widgets having a minimum vertical distance and a minimum horizontal distance from the current focused widget, in the vertical direction of movement; and selecting as the next focused widget, when the directional information indicates movement in a horizontal direction, a widget having a minimum distance from the current widget in the horizontal direction of movement and on an equivalent horizon as the current widget; and transmitting information for use in displaying the selected widget with focus.

2. The method of claim 1, wherein determining further comprises:

selecting as the next focused widget, when no widget is on the equivalent horizon, a displayed one of the widgets having a minimum vertical distance and a minimum horizontal distance from the current widget in the horizontal direction of movement.

3. The method of claim 1, wherein receiving user-entered directional information comprises receiving the directional information via user-entered voice commands.

4. The method of claim 1, wherein receiving user-entered directional information comprises receiving the directional information without the aid of a pointing device.

5. A method in a data processing system having a display device for selecting a widget to be displayed with focus from among a set of displayed widgets without the aid of a pointing device, comprising:

receiving user-entered directional information indicating a direction of intended movement of focus from a current focused widget;

determining a next focused widget from among the set of displayed widgets based upon the user-entered directional information and positional information for each of the displayed widgets, wherein determining includes:

selecting as the next focused widget, when the directional information indicates movement in a vertical direction, a displayed one of the widgets having a minimum vertical distance and a minimum horizontal distance from the current focused widget, in the vertical direction of movement; and when the directional information indicates movement in a horizontal direction, selecting as the next focused widget a widget having a minimum distance from the current widget in the horizontal direction of movement and on an equivalent horizon as the current widget and, and when no widget is on the equivalent horizon, selecting as the next focused widget a widget having a having a minimum vertical distance and a minimum horizontal distance from the current widget in the horizontal direction of movement; and transmitting information for use in displaying the selected widget with focus.

6. The method of claim 5, wherein receiving user-entered directional information comprises receiving user-entered voice commands.

* * * * *

UNITED STATES PATENT AND TRADEMARK OFFICE
CERTIFICATE OF CORRECTION

PATENT NO. : 6,892,360 B1
DATED : May 10, 2005
INVENTOR(S) : Pabla Kuldipsingh et al.

It is certified that error appears in the above-identified patent and that said Letters Patent is hereby corrected as shown below:

Column 11,
Line 9, delete "and" (second occurrence).
Line 11, delete "having a" (second occurrence).

Signed and Sealed this

Second Day of August, 2005

JON W. DUDAS
*Director of the United States Patent and Trademark Office*